(12) United States Patent
Yamada et al.

(10) Patent No.: US 12,046,928 B2
(45) Date of Patent: Jul. 23, 2024

(54) POWER SUPPLY UNIT FOR AEROSOL INHALER, AEROSOL INHALER, POWER SUPPLY CONTROL METHOD OF AEROSOL INHALER, AND POWER SUPPLY CONTROL PROGRAM OF AEROSOL INHALER

(71) Applicant: JAPAN TOBACCO INC., Tokyo (JP)

(72) Inventors: Manabu Yamada, Tokyo (JP); Takeshi Akao, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 8 days.

(21) Appl. No.: 17/241,926

(22) Filed: Apr. 27, 2021

(65) Prior Publication Data

US 2021/0249878 A1 Aug. 12, 2021

Related U.S. Application Data

(63) Continuation of application No. 16/669,053, filed on Oct. 30, 2019, now Pat. No. 11,025,071.

(30) Foreign Application Priority Data

Oct. 31, 2018 (JP) ................................. 2018-204703

(51) Int. Cl.
| | | |
|---|---|---|
| *H02J 7/00* | (2006.01) | |
| *A24B 15/167* | (2020.01) | |
| *A24F 40/05* | (2020.01) | |
| *A24F 40/30* | (2020.01) | |
| *A24F 40/50* | (2020.01) | |

(Continued)

(52) U.S. Cl.
CPC ........ *H02J 7/00041* (2020.01); *A24B 15/167* (2016.11); *A24F 40/05* (2020.01); *A24F 40/30* (2020.01); *A24F 40/50* (2020.01); *A24F 40/60* (2020.01); *A24F 40/90* (2020.01);
(Continued)

(58) Field of Classification Search
USPC .................................................. 320/136, 132
See application file for complete search history.

(56) References Cited

U.S. PATENT DOCUMENTS 4,188,182 A * 2/1980 Junak ...................... F23Q 3/004
431/70
4,775,827 A * 10/1988 Ijntema ............... H02J 7/00714
320/132
(Continued)

FOREIGN PATENT DOCUMENTS

| CA | 3 048 772 A1 | 8/2018 |
|---|---|---|
| CA | 3 054 273 A1 | 9/2018 |

(Continued)

OTHER PUBLICATIONS

European Office Action for European Application No. 21 165 191.4, dated Sep. 24, 2021.
(Continued)

*Primary Examiner* — Samuel Berhanu
(74) *Attorney, Agent, or Firm* — XSENSUS LLP

(57) ABSTRACT

A power supply unit for an aerosol inhaler includes: a power supply that is able to discharge power to a load for generating an aerosol from an aerosol generation source; and a control unit that is configured to control at least one of charging and discharging of the power supply such that the power supply does not become one or both of a fully charged state and a discharging termination state.

5 Claims, 9 Drawing Sheets

(51) Int. Cl.
　　*A24F 40/60*　　　　(2020.01)
　　*A24F 40/90*　　　　(2020.01)
　　*H02J 9/00*　　　　(2006.01)

(52) U.S. Cl.
　　CPC ............ *H02J 7/0047* (2013.01); *H02J 7/007* (2013.01); *H02J 9/005* (2013.01)

(56) References Cited

U.S. PATENT DOCUMENTS

| | | | |
|---|---|---|---|
| 6,091,228 | A | 7/2000 | Chady et al. |
| 6,366,809 | B1 * | 4/2002 | Olson .................. A61N 1/3975 607/29 |
| 2008/0133815 | A1 | 6/2008 | Mori |
| 2014/0014125 | A1 | 1/2014 | Fernando et al. |
| 2014/0239908 | A1 * | 8/2014 | Ichikawa .............. H02J 7/0016 320/134 |
| 2015/0020830 | A1 | 1/2015 | Koller |
| 2015/0272223 | A1 | 10/2015 | Weigensberg et al. |
| 2015/0335070 | A1 | 11/2015 | Sears et al. |
| 2016/0021934 | A1 * | 1/2016 | Cadieux ................ A24F 40/40 131/328 |
| 2016/0036255 | A1 | 2/2016 | Aronov et al. |
| 2016/0073695 | A1 | 3/2016 | Sears et al. |
| 2016/0204637 | A1 | 7/2016 | Alarcon et al. |
| 2016/0302471 | A1 | 10/2016 | Bowen et al. |
| 2017/0027234 | A1 | 2/2017 | Farine et al. |
| 2017/0065000 | A1 | 3/2017 | Sears et al. |
| 2017/0150758 | A1 | 6/2017 | Fernando et al. |
| 2018/0252776 | A1 | 9/2018 | Takechi et al. |
| 2018/0271155 | A1 | 9/2018 | Baker et al. |
| 2019/0045837 | A1 | 2/2019 | Spencer |
| 2020/0086068 | A1 | 3/2020 | Lee et al. |
| 2020/0093177 | A1 | 3/2020 | Han et al. |
| 2020/0093185 | A1 | 3/2020 | Lim |

FOREIGN PATENT DOCUMENTS

| | | |
|---|---|---|
| EP | 2701268 A1 | 2/2014 |
| JP | 2015-50009 A | 3/2015 |
| JP | 2015184194 A * | 10/2015 |
| JP | 2017-514463 A | 6/2017 |
| JP | 2018-19695 A | 2/2018 |
| JP | 2018-57384 A | 4/2018 |
| JP | 2018-93877 A | 6/2018 |
| KR | 10-0575553 B1 | 5/2006 |
| KR | 10-2018-0045000 A | 5/2018 |
| KR | 10-2018-0070436 A | 6/2018 |
| KR | 10-2018-0107161 A | 10/2018 |
| RU | 2 625 456 C1 | 7/2017 |
| WO | WO 2015/075814 A1 | 5/2015 |
| WO | WO 2018/138749 A1 | 8/2018 |
| WO | WO 2018/138750 A1 | 8/2018 |
| WO | WO 2018/163262 A1 | 9/2018 |

OTHER PUBLICATIONS

European Search Report for European Application No. 21165191.4, dated Sep. 14, 2021.
Eurasian Search Report for Eurasian Application No. 202190383, dated Aug. 25, 2021, with English translation.
European Communication pursuant to Article 94(3) EPC for European Application No. 19206194.3, dated Jun. 8, 2020.
Extended European Search Report, dated Apr. 3, 2020, for European Application No. 19206194.3.
Japanese Office Action for Japanese Application No. 2020-098870 dated Aug. 7, 2020 with English translation.
Korean Office Action for Korean Application No. 10-2019-0137107, dated Apr. 17, 2020, with English translation.
Office Action for JP 2018-204703 dated Feb. 12, 2019, with English translation.
Office Action for JP 2018-204703 dated Jul. 2, 2019, with English translation.

\* cited by examiner

POWER SUPPLY UNIT FOR AEROSOL INHALER, AEROSOL INHALER, POWER SUPPLY CONTROL METHOD OF AEROSOL INHALER, AND POWER SUPPLY CONTROL PROGRAM OF AEROSOL INHALER

CROSS-REFERENCE TO RELATED APPLICATIONS

This application is a Continuation of U.S. application Ser. No. 16/669,053, filed on Oct. 30, 2019, which claims the benefit of priority from prior Japanese patent application No. 2018-204703, filed on Oct. 31, 2018, the entire contents of which are incorporated herein by reference.

TECHNICAL FIELD

The present invention relates to a power supply unit for an aerosol inhaler, the aerosol inhaler, a power supply control method of the aerosol inhaler, and a power supply control program of the aerosol inhaler.

BACKGROUND ART

There is available an aerosol inhaler which includes an aerosol generation source, a load for generating an aerosol from the aerosol generation source, a power supply able to discharge power to the load, and a control unit for controlling the power supply (see Patent Literatures 1 to 3 for instance).

Patent Literature 1: JP-A-2018-093877
Patent Literature 2: JP-A-2018-057384
Patent Literature 3: JP-A-2018-019695

Since an aerosol inhaler can be often used, charging and discharging of a power supply of the aerosol inhaler can be frequently performed. For this reason, it is required to suppress deterioration in the performance of the power supply.

An object of the present invention is to provide a power supply unit for an aerosol inhaler, a power supply control method of the aerosol inhaler, and a power supply control program of the aerosol inhaler, capable of suppressing deterioration in the performance of a power supply.

SUMMARY OF INVENTION

According to an aspect of the invention, there is provided a power supply unit for an aerosol inhaler, the power supply unit comprising: a power supply that is able to discharge power to a load for generating an aerosol from an aerosol generation source; and a control unit that is configured to control at least one of charging and discharging of the power supply such that the power supply does not become one or both of a fully charged state and a discharging termination state.

DESCRIPTION OF EMBODIMENTS

Figure 1:
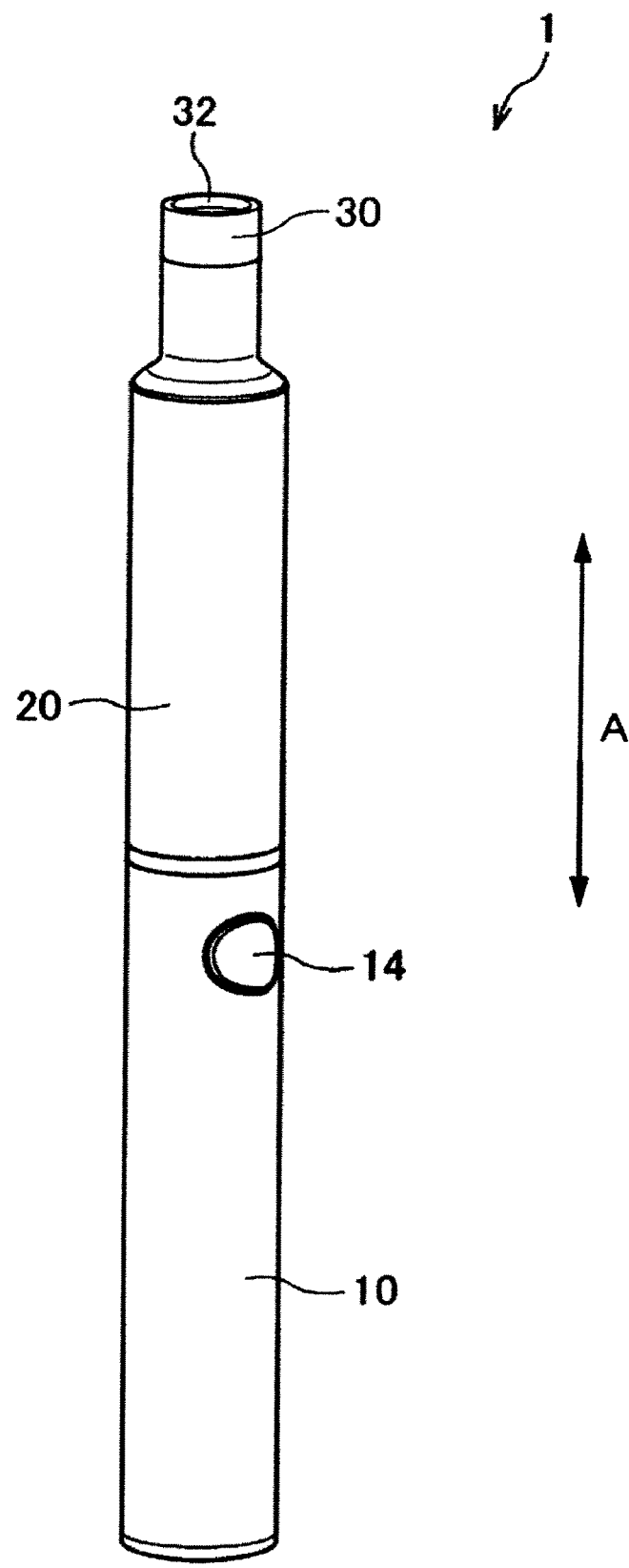
FIG. 1 is a perspective view of an aerosol inhaler equipped with a power supply unit of an embodiment of the present invention.
Figure 2:
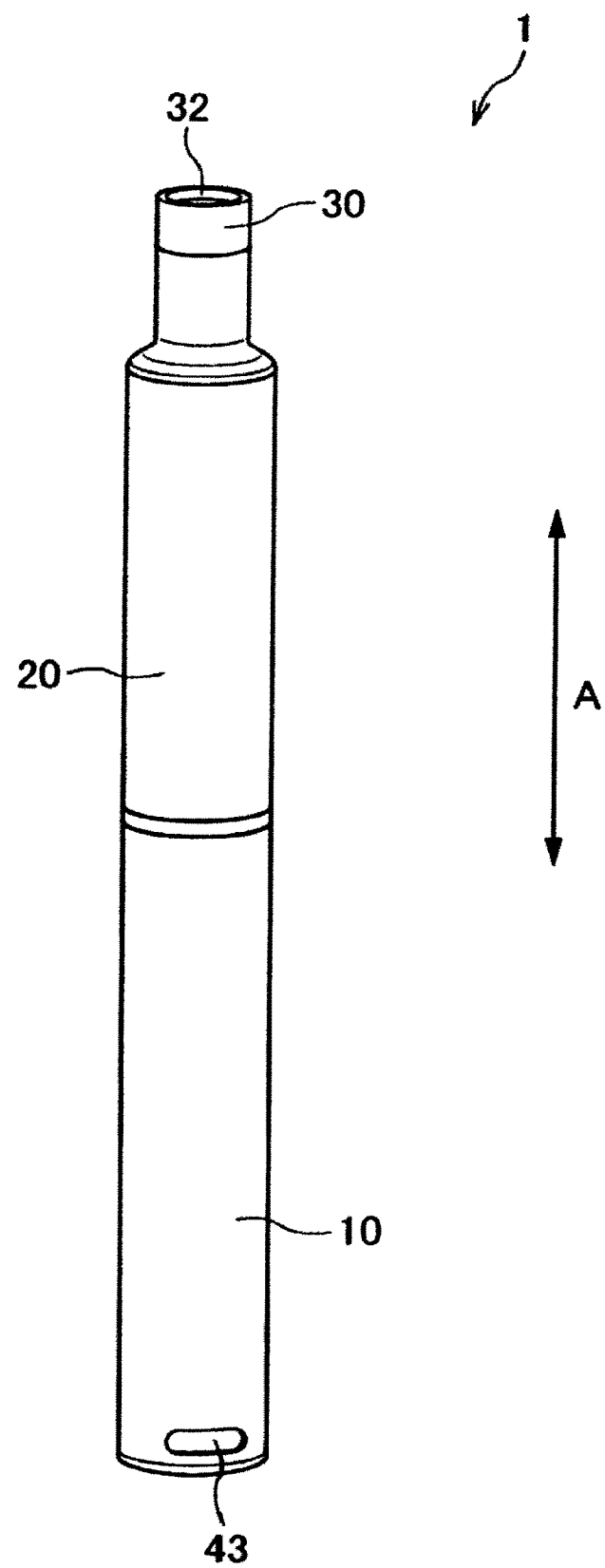
FIG. 2 is another perspective view of the aerosol inhaler of FIG. 1.

Hereinafter, a power supply unit for an aerosol inhaler according to an embodiment of the present invention will be described. First of all, the aerosol inhaler equipped with the power supply unit will be described with reference to FIG. 1 and FIG. 2.

(Aerosol Inhaler)

An aerosol inhaler 1 is a device for inhaling an aerosol containing a flavor added without combustion, and has a rod shape extending along a certain direction (hereinafter, referred to as the longitudinal direction A). The aerosol inhaler 1 includes a power supply unit 10, a first cartridge 20, and a second cartridge 30 which are arranged in the order along the longitudinal direction A. The first cartridge 20 can be attached to and detached from the power supply unit 10. The second cartridge 30 can be attached to and detached from the first cartridge 20. In other words, the first cartridge 20 and the second cartridge 30 can be individually replaced.

(Power Supply Unit)

Figure 3:
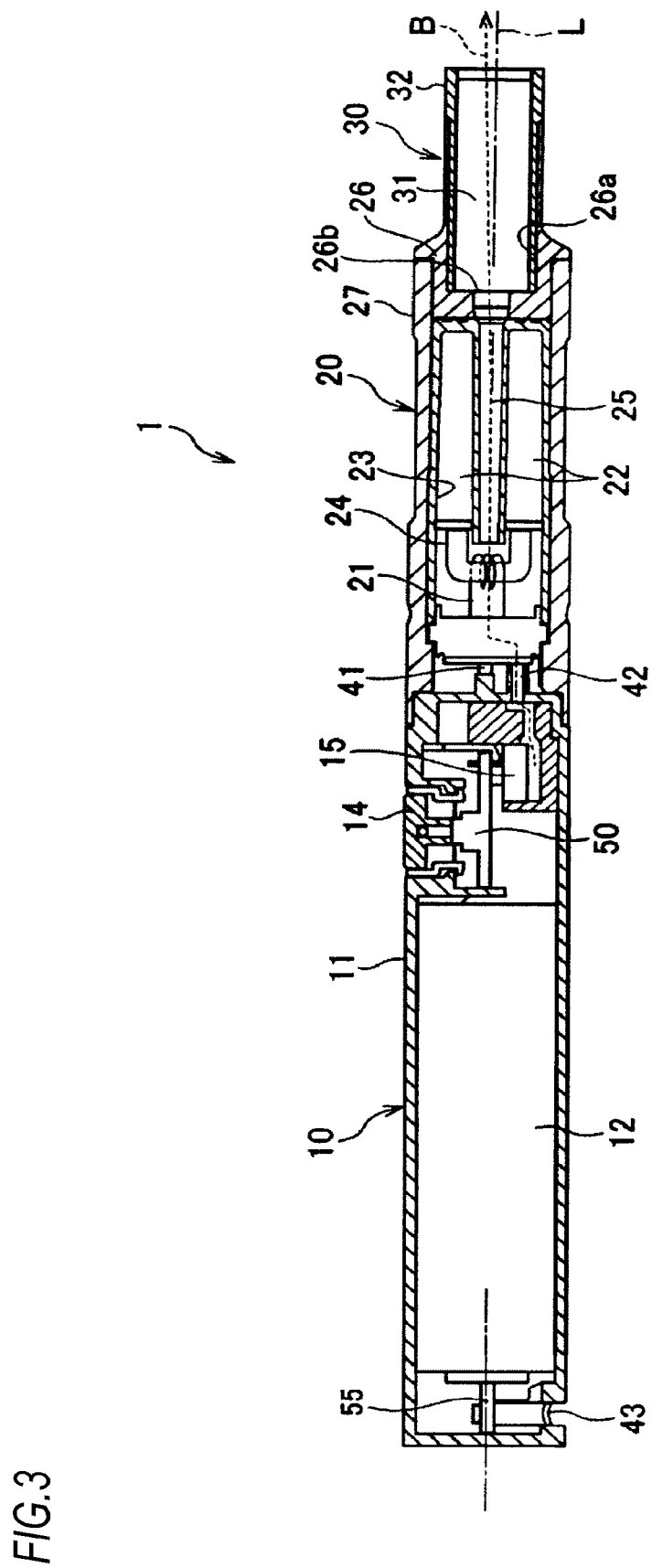
FIG. 3 is a cross-sectional view of the aerosol inhaler of FIG. 1.
Figure 4:
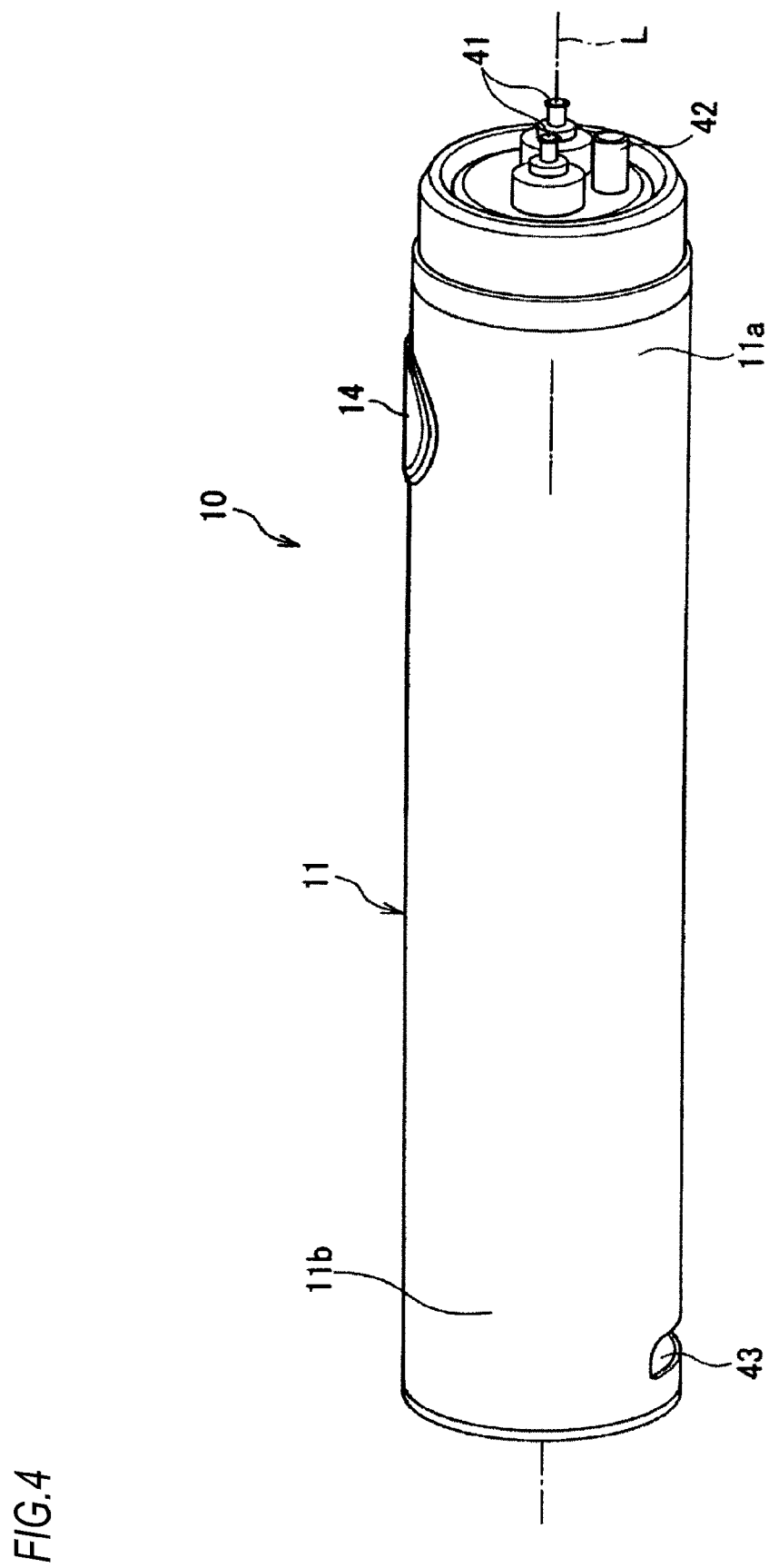
FIG. 4 is a perspective view of the power supply unit in the aerosol inhaler of FIG. 1.
Figure 6:
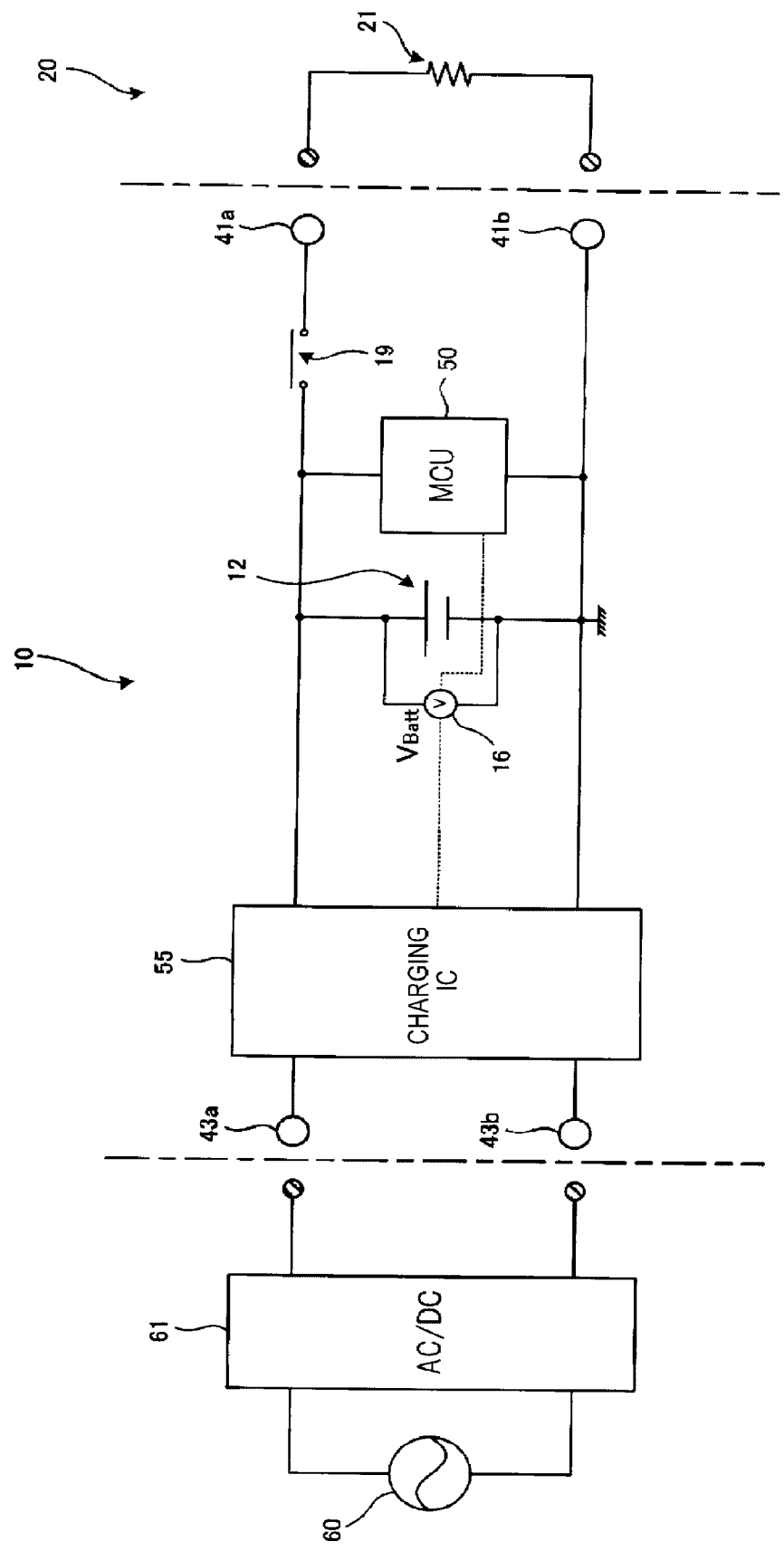
FIG. 6 is a schematic diagram illustrating the circuit configuration of the power supply unit in the aerosol inhaler of FIG. 1.

The power supply unit 10 of the present embodiment includes a power supply 12, a charging IC 55, an MCU 50, a switch 19, a voltage sensor 16, various sensors, and so on in a cylindrical power supply unit case 11, as shown in FIG. 3, FIG. 4, and FIG. 6. The power supply 12 is a chargeable secondary battery, an electric double-layer capacitor, or the like, and is preferably a lithium-ion battery.

On a top part 11a of the power supply unit case 11 positioned on one end side in the longitudinal direction A (the first cartridge (20) side), a discharging terminal 41 is provided. The discharging terminal 41 is provided so as to protrude from the top surface of the top part 11a toward the first cartridge 20, and is configured to be able to be electrically connected to a load 21 of the first cartridge 20.

Further, on a part of the top surface of the top part 11a in the vicinity of the discharging terminal 41, an air supply part 42 for supplying air to the load 21 of the first cartridge 20 is provided.

On a bottom part 11b of the power supply unit 10 positioned on the other end side in the longitudinal direction A (the opposite side to the first cartridge 20), a charging terminal 43 able to be electrically connected to an external power supply 60 (see FIG. 6) capable of charging the power supply 12 is provided. The charging terminal 43 is provided on the side surface of the bottom part 11b, such that, for example, at least one of USB terminals, micro USB terminals, and Lightning terminals can be connected thereto.

However, the charging terminal 43 may be a power receiving part able to receive power from the external power supply 60 in a non-contact manner. In this case, the charging terminal 43 (the power receiving part) may be composed of a power receiving coil. The wireless power transfer system may be an electromagnetic induction type, or may be a magnetic resonance type. Also, the charging terminal 43 may be a power receiving part able to receive power from the external power supply 60 without any contact point. As another example, the charging terminal 43 may be configured such that at least one of USB terminals, micro USB terminals, and Lightning terminals can be connected thereto and the above-mentioned power receiving part is included therein.

On the side surface of the top part 11a of the power supply unit case 11, an operation unit 14 which the user can operate is provided so as to face the opposite side to the charging terminal 43. More specifically, the operation unit 14 and the charging terminal 43 are symmetric with respect to the point of intersection of a straight line connecting the operation unit 14 and the charging terminal 43 and the center line of the power supply unit 10 in the longitudinal direction A. The operation unit 14 is composed of a button type switch, a touch panel, or the like. In the vicinity of the operation unit 14, an inhalation sensor 15 for detecting a puff action are provided.

The charging IC 55 is disposed close to the charging terminal 43, and performs control on charging of the power supply 12 with power which is input from the charging terminal 43. The charging IC 55 includes a converter for converting direct current, which is applied from an inverter 61 or the like provided for converting alternating current into direct current on a charging cable which is connected to the charging terminal, into direct current having a different parameter, a voltmeter for measuring charging voltage $V_{CHG}$ which is supplied from the converter to the power supply 12, an ammeter for measuring charging current $I_{CHG}$ which is supplied from the converter to the power supply 12, a processor for controlling them, and so on. In this specification, the processor is more specifically an electric circuit configured by combining circuit elements such as semiconductor elements.

The charging IC 55 selectively performs constant current charging (CC charging) for charging the power supply 12 by performing control such that the charging current $I_{CHG}$ becomes constant, and constant voltage charging (CV charging) for charging the power supply 12 by performing control such that the charging voltage $V_{CHG}$ becomes constant. The charging IC 55 charges the power supply 12 by CC charging, in the state where power-supply voltage $V_{Batt}$ corresponding to the amount of power stored in the power supply 12 is lower than a predetermined CV switch voltage, and charges the power supply 12 by CV charging, in the state where the power-supply voltage $V_{Batt}$ is equal to or higher than the above-mentioned CV switch voltage.

Figure 5:
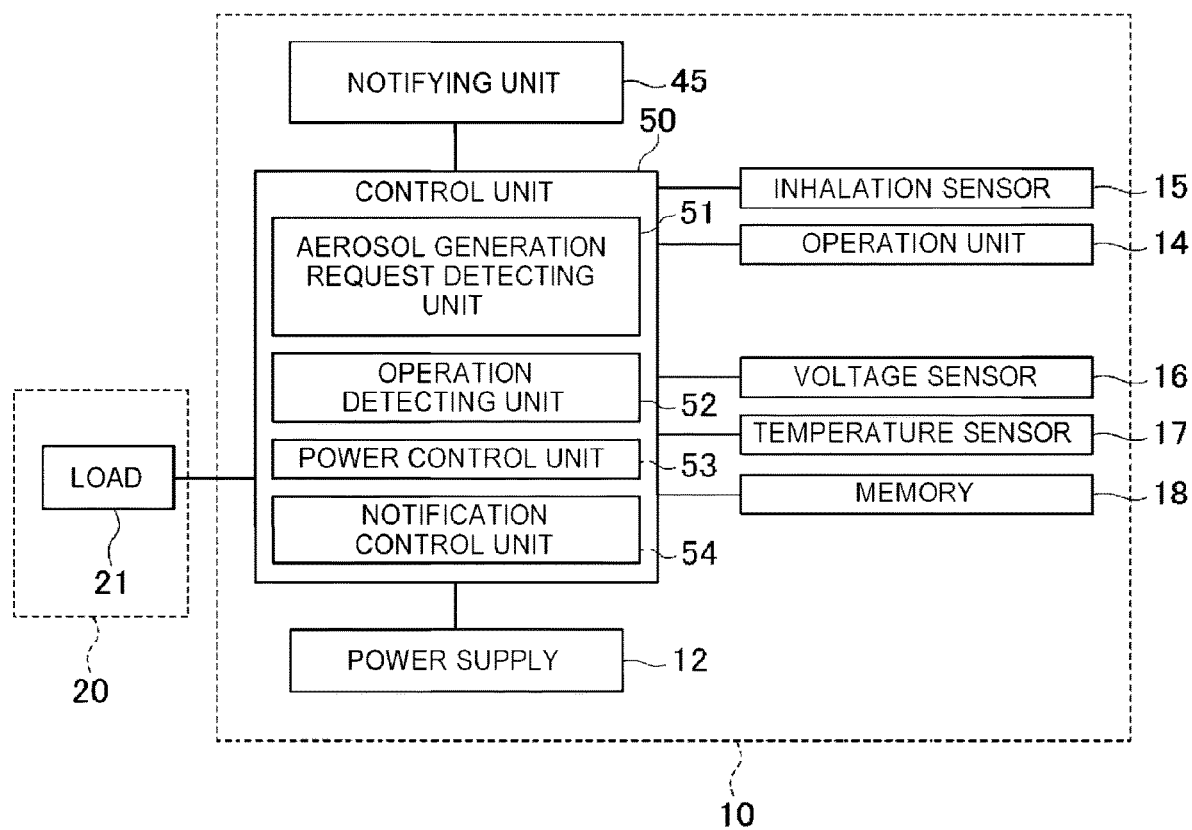
FIG. 5 is a block diagram illustrating the main part configuration of the power supply unit in the aerosol inhaler of FIG. 1.

The MCU 50 is connected to various sensor devices, such as the inhalation sensor 15 for detecting a puff (inhaling) action, a voltage sensor 16 for measuring the power-supply voltage $V_{Batt}$ of the power supply 12, and a temperature sensor 17 for measuring the temperature of the power supply 12, the operation unit 14, a notifying unit 45 (to be described below), and a memory 18 for storing the number of puff actions, the time for which power has been applied to the load 21, as shown in FIG. 5, and performs a variety of control on the aerosol inhaler 1. The MCU 50 is specifically a processor.

Also, in the power supply unit case 11, an air intake (not shown in the drawings) for taking in air is formed. The air intake may be formed around the operation unit 14, or may be formed around the charging terminal 43.

(First Cartridge)

As shown in FIG. 3, the first cartridge 20 includes a reservoir 23 for storing an aerosol source 22, the electric load 21 for atomizing the aerosol source 22, a wick 24 for drawing the aerosol source from the reservoir 23 toward the load 21, an aerosol channel 25 for an aerosol generated by atomizing the aerosol source 22 to flow toward the second cartridge 30, an end cap 26 for storing a part of the second cartridge 30.

The reservoir 23 is formed so as to surround the aerosol channel 25, and holds the aerosol source 22. In the reservoir 23, a porous member such as a resin web or cotton may be stored, and the porous member may be impregnated with the aerosol source 22. The aerosol source 22 includes a liquid such as glycerin, propylene glycol, or water.

The wick 24 is a liquid holding member for drawing the aerosol source 22 toward the load 21 using capillarity, and is configured with, for example, glass fiber, a porous ceramic, or the like.

The load 21 atomizes the aerosol source 22 without combustion by power which is supplied from the power supply 12 through the discharging terminal 41. The load 21 is configured with a heating wire wound with a predetermined pitch (a coil). However, the load 21 needs only to be an element capable of atomizing the aerosol source 22, thereby generating an aerosol, and is, for example, a heating element or an ultrasonic wave generator. Examples of the heating element include a heating resistor, a ceramic heater, an induction heating type heater, and so on.

The aerosol channel 25 is provided on the downstream side of the load 21 on the center line L of the power supply unit 10.

The end cap 26 includes a cartridge storage part 26a for storing a part of the second cartridge 30, and a connecting passage 26b for connecting the aerosol channel 25 and the cartridge storage part 26a.

(Second Cartridge)

The second cartridge 30 holds a flavor source 31. The end part of the second cartridge 30 on the first cartridge (20) side is stored in the cartridge storage part 26a provided in the end cap 26 of the first cartridge 20, so as to be able to be removed. The end part of the second cartridge 30 on the opposite side to the first cartridge (20) side is configured as an inhalation port 32 for the user. However, the inhalation port 32 does not necessarily need to be configured integrally with the second cartridge 30 so as not to be separable from the second cartridge, and may be configured to be able to be attached to and detached from the second cartridge 30. If the inhalation port 32 is configured separately from the power supply unit 10 and the first cartridge 20 as described above, it is possible to keep the inhalation port 32 sanitary.

The second cartridge 30 adds a flavor to the aerosol generated by atomizing the aerosol source 22 by the load 21, by passing the aerosol through the flavor source 31. As a raw material piece which constitutes the flavor source, a compact made by forming shredded tobacco or a tobacco raw material into a grain shape can be used. The flavor source 31 may be configured with a plant (such as mint or a herbal medicine, or a herb) other than tobacco. To the flavor source 31, a flavoring agent such as menthol may be added.

The aerosol inhaler 1 of the present embodiment can generate an aerosol containing the flavor by the aerosol source 22, the flavor source 31, and the load 21. In other words, the aerosol source 22 and the flavor source 31 constitute an aerosol generation source for generating an aerosol.

The aerosol generation source in the aerosol inhaler 1 is a part which the user can replace to use. For this part, for example, one first cartridge 20 and one or more (for example, five) second cartridges 30 can be provided as one set to the user.

The configuration of the aerosol generation source which can be used in the aerosol inhaler 1 is not limited to the configuration in which the aerosol source 22 and the flavor source 31 are configured separately, and may be a configuration in which the aerosol source 22 and the flavor source 31 are formed integrally, a configuration in which the flavor source 31 is omitted and the aerosol source 22 contains a substance which can be contained in the flavor source 31, a configuration in which the aerosol source 22 contains a medical substance or the like instead of the flavor source 31, or the like.

For an aerosol inhaler 1 including an aerosol generation source configured by integrally forming an aerosol source 22 and a flavor source 31, for example, one or more (for example, 20) aerosol generation sources may be provided as one set to the user.

In the case of an aerosol inhaler 1 including only an aerosol source 22 as an aerosol generation source, for example, one or more (for example, 20) aerosol generation sources may be provided as one set to the user.

In the aerosol inhaler 1 configured as described above, as shown by an arrow B in FIG. 3, air entering from the intake (not shown in the drawings) formed in the power supply unit case 11 passes through the air supply part 42, and passes near the load 21 of the first cartridge 20. The load 21 atomizes the aerosol source 22 drawn from the reservoir 23 by the wick 24. The aerosol generated by atomizing flows through the aerosol channel 25 together with the air entering from the intake, and is supplied to the second cartridge 30 through the connecting passage 26b. The aerosol supplied to the second cartridge 30 passes through the flavor source 31, whereby the flavor is added, and is supplied to the inhalation port 32.

Also, in the aerosol inhaler 1, a notifying unit 45 for notifying a variety of information is provided (see FIG. 5). The notifying unit 45 may be configured with a light emitting element, or may be configured with a vibrating element, or may be configured with a sound output element. The notifying unit 45 may be a combination of two or more elements of light emitting elements, vibrating elements, and sound output elements. The notifying unit 45 may be provided in any one of the power supply unit 10, the first cartridge 20, and the second cartridge 30; however, it is preferable that the notifying unit be provided in the power supply unit 10. For example, the area around the operation unit 14 is configured to have translucency to permit light which is emitted by a light emitting element such as an LED to pass through.

(Electronic Circuit)

Now, the details of the electric circuit of the power supply unit 10 will be described with reference to FIG. 6.

The power supply unit 10 includes the power supply 12, a positive electrode side discharging terminal 41a and a negative electrode side discharging terminal 41b which constitute the discharging terminal 41, a positive electrode side charging terminal 43a and a negative electrode side charging terminal 43b which constitute the charging terminal 43, the MCU (Micro Controller Unit) 50 which is connected between the positive electrode side of the power supply 12 and the positive electrode side discharging terminal 41a and between the negative electrode side of the power supply 12 and the negative electrode side discharging terminal 41b, the charging IC 55 which is disposed on the power transmission path between the charging terminal 43 and the power supply 12, and a switch 19 which is disposed on the power transmission path between the power supply 12 and the discharging terminal 41.

The switch 19 is configured with, for example, a semiconductor element such as a MOSFET, and is opened and closed by control of the MCU 50. The MCU 50 has a function of detecting that the external power supply 60 is connected to the charging terminal 43, on the basis of variation in the voltage between the MCU and the charging terminal 43.

In the electric circuit of the power supply unit 10 shown in FIG. 6, the switch 19 is provided between the positive electrode side of the power supply 12 and the positive electrode side discharging terminal 41a. Instead of this so-called plus control type, the switch 19 may be a minus control type which is provided between the negative electrode side discharging terminal 41b and the negative electrode side of the power supply 12.

(MCU)

Now, the configuration of the MCU 50 will be described in more detail.

As shown in FIG. 5, the MCU 50 includes an aerosol generation request detecting unit 51, an operation detecting unit 52, a power control unit 53, and a notification control unit 54 as functional blocks which are implemented by executing a program.

The aerosol generation request detecting unit 51 detects a request for aerosol generation on the basis of the output result of the inhalation sensor 15. The inhalation sensor 15 is configured to output the value of a variation in the pressure in the power supply unit 10 (the internal pressure) caused by inhalation of the user through the inhalation port 32. The inhalation sensor 15 is, for example, a pressure sensor for outputting an output value (for example, a voltage value or a current value) according to the internal pressure which varies according to the flow rate of air which is sucked from the intake (not shown in the drawings) toward the inhalation port 32 (i.e. a puff action of the user). The inhalation sensor 15 may be configured with a capacitor microphone or the like.

The operation detecting unit 52 detects an operation which is performed on the operation unit 14 by the user.

The notification control unit 54 controls the notifying unit 45 such that the notifying unit notifies a variety of information. For example, the notification control unit 54 controls the notifying unit 45 in response to detection of a timing to replace the second cartridge 30, such that the notifying unit notifies the timing to replace the second cartridge 30. The notification control unit 54 detects and notifies a timing to replace the second cartridge 30, on the basis of the number of puff actions and the cumulative time for which power has been supplied to the load 21, stored in the memory 18. The notification control unit 54 is not limited to notification of a timing to replace the second cartridge 30, and may notify a timing to replace the first cartridge 20, a timing to replace the power supply 12, a timing to charge the power supply 12, and so on.

In the state where one unused second cartridge 30 is set, if a predetermined number of puff actions are performed, or if the cumulative time for which power has been applied to the load 21 due to puff actions reaches a predetermined value (for example, 120 seconds), the notification control unit 54 determines that the second cartridge 30 is used up (i.e. the remaining amount is zero or the second cartridge is empty), and notifies the timing to replace the second cartridge 30.

Also, in the case of determining that all of the second cartridges 30 included in one set are used up, the notification control unit 54 may determine that one first cartridge 20 included in the single set is used up (i.e. the remaining amount is zero or the first cartridge is empty), and notify the timing to replace the first cartridge 20.

Also, the notification control unit 54 calculates the state of charge (SOC) indicating the ratio of the amount of power stored in the power supply 12 (the amount of stored power) to the capacity (full charge capacity) of the power supply 12 (in percentages), as a numerical index indicating the state of charge of the power supply 12, and controls the notifying unit 45 such that the notifying unit notifies the calculated SOC.

The notification control unit 54 determines, for example, which of a first range equal to or larger than 0% and smaller than 33%, a second range equal to or larger than 33% and smaller than 66%, and a third range equal to or larger than 66% and smaller than 100% the SOC belongs to. Further, depending on the case where the SOC is in the first range, the case where the SOC is in the second range, and the case where the SOC is in the third range, the notification control unit 54 performs control, for example, turning on or flashing light emitting elements included in the notifying unit 45 in different colors, turning on or flashing light emitting elements included in the notifying unit 45 in different patterns, changing the number of light emitting elements to be turned on or flashed, of a plurality of light emitting elements included in the notifying unit 45, changing the output sound of a sound output element of the notifying unit 45, or changing the vibration pattern of a vibrating element of the notifying unit 45. Therefore, the user of the aerosol inhaler 1 can intuitively the magnitude of the SOC of the power supply 12 by sound, color, or vibration, not by characters or an image which is displayed on a display or the like.

If the notification control unit 54 notifies the SOC in the above-mentioned way, even if charging stop control to be described below is performed, as compared to the case of directly displaying the value of the SOC, it is possible to effectively reduce a feeling of strangeness which the user feels.

The power control unit 53 controls discharging of the power supply 12 through the discharging terminal 41 by switching on and off the switch 19 if the aerosol generation request detecting unit 51 detects the request for aerosol generation.

The power control unit 53 performs control such that the amount of aerosol which is generated by atomizing the aerosol source by the load 21 falls in a desired range, i.e. such that the amount of power which is supplied from the power supply 12 to the load 21 falls in a predetermined range. Specifically, the power control unit 53 controls switching on and off of the switch 19 by, for example, PWM (Pulse Width Modulation) control. Alternatively, the power control unit 53 may control switching on and off of the switch 19 by PFM (Pulse Frequency Modulation) control.

The power control unit 53 stops supply of power from the power supply 12 to the load 21 if a predetermined period passes after start of supply of power to the load 21. In other words, even while the user is actually performing a puff action, if the puff period exceeds a certain period, the power control unit 53 stops supply of power from the power supply 12 to the load 21. The certain period is determined to suppress variation in user's puff period.

By control of the power control unit 53, the current which flows in the load 21 during one puff action becomes substantially a constant value which is determined according to substantially constant effective voltage which is supplied to the load 21 by PWM control, and the resistance values of the discharging terminal 41 and the load 21. In the aerosol inhaler 1 of the present embodiment, when the user inhales an aerosol using one unused second cartridge 30, the cumulative time for which power can be supplied to the load 21 is controlled to a maximum of, for example, 120 seconds. Therefore, in the case where one first cartridge 20 and five second cartridges 30 constitute one set, it is possible to obtain the maximum amount of power required to empty (use up) the single set, in advance.

Also, the power control unit 53 detects an electric connection between the charging terminal 43 and the external power supply 60. Then, in the state where charging of the power supply 12 is being performed by the charging IC 55, the power control unit 53 performs control for stopping charging of the power supply 12 if the SOC of the power supply 12 becomes a value smaller than 100% (for example, an arbitrary value equal to or smaller than 95% or 90%), such that the power supply 12 does not become the fully charged state. By this control, the power supply 12 is maintained in the state where it is unlikely to deteriorate.

In the case of using a lithium-ion secondary battery or the like as the power supply 12, the SOC value when the power supply 12 is left as it is exerts an influence on deterioration of the power supply 12. This influence on deterioration increases as the SOC gets closer to 100% or 0%. Meanwhile, this influence on deterioration becomes minimum when the SOC is between 30% and 70%. Therefore, if the SOC of the power supply 12 is maintained at a value smaller than 100%, it is possible to maintain the state where the power supply 12 is unlikely to deteriorate.

Also, the power control unit 53 performs charging stop control on the power supply 12, such that power more than the amount of power required to be supplied to the load 21 in order to empty one unused set or a plurality of unused sets (hereinafter, two sets are assumed) which are provided to the user is stored in the power supply 12. This makes it possible to use up one set or two sets of aerosol generation sources even if charging of the power supply 12 is completed before the power supply becomes the fully charged state. In other words, it is possible to achieve both of suppression of deterioration of the power supply 12 and improvement of user convenience.

Hereinafter, the amount of power required to be supplied to the load 21 in order to empty one set of unused aerosol generation sources will be referred to as the amount of necessary power for one set, and the amount of power required to be supplied to the load 21 in order to empty two sets of unused aerosol generation sources will be referred to as the amount of necessary power for two sets.

(Charging Stop Control on Power Supply)

In this control, during discharging control for discharging power from the power supply 12 to the load 21, the MCU 50 stops discharging (in other words, the MCU prohibits discharging) when the SOC of the power supply 12 becomes 0%, and notifies the timing to charge the power supply 12 by the notifying unit 45. Meanwhile, the MCU 50 determines an upper-limit-side arbitrary range (for example, a range between 90% and 95%) of an SOC range in which the power supply 12 is unlikely to deteriorate, in advance, and controls the charging IC 55 such that the charging IC completes charging of the power supply 12, if the SOC of the power supply 12 reaches a specific value in that range in the course of charging of the power supply 12 by the charging IC 55. Hereinafter, the SOC of the power supply 12 when the MCU 50 completes charging of the power supply 12 will be referred to as the charging stop SOC.

As the power supply 12, a high-capacity power supply is used such that the amount of stored power corresponding to the minimum value (90%) of the SOC in the above-mentioned arbitrary range is equal to or larger than the amount of necessary power for two sets. As a result, in the state where deterioration of the power supply 12 is less, even if control for stopping charging of the power supply 12 in the state where the SOC is 90% is performed, discharging for using up two sets of aerosol generation sources is possible. Therefore, even though the power supply 12 is not charged to the fully charged state (in which the SOC is 100%), user convenience is not damaged.

Figure 7:
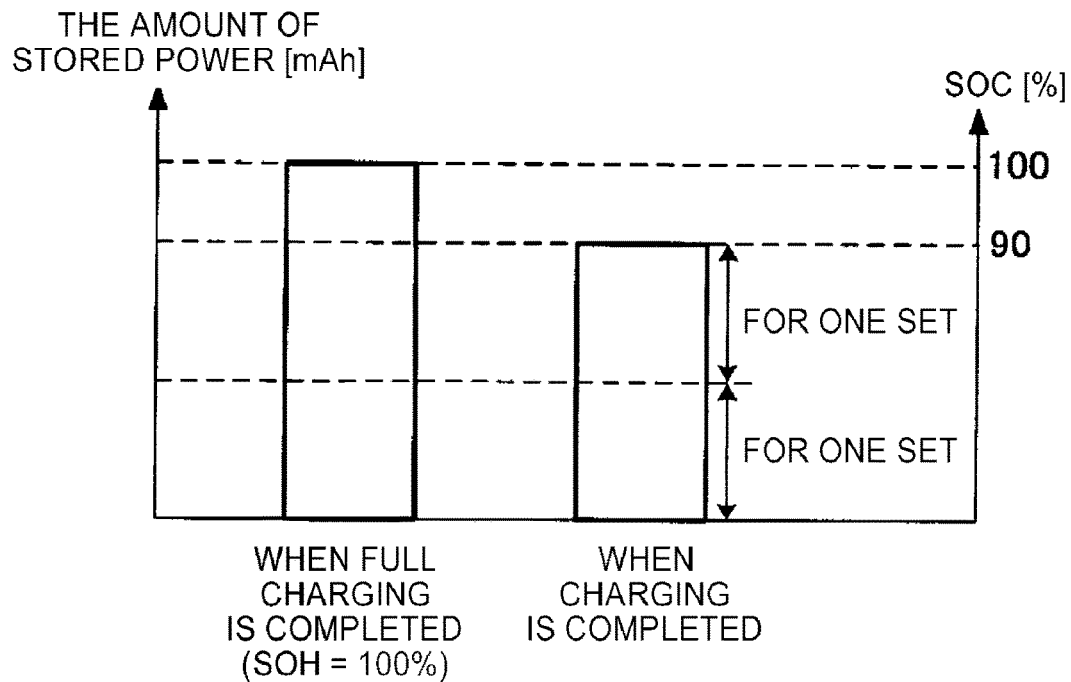
FIG. 7 is a view illustrating an example of the relation between the full charge capacity of the power supply of FIG. 6 when the power supply is brand new and the amount of power stored in the power supply when charging is completed.
Figure 8:
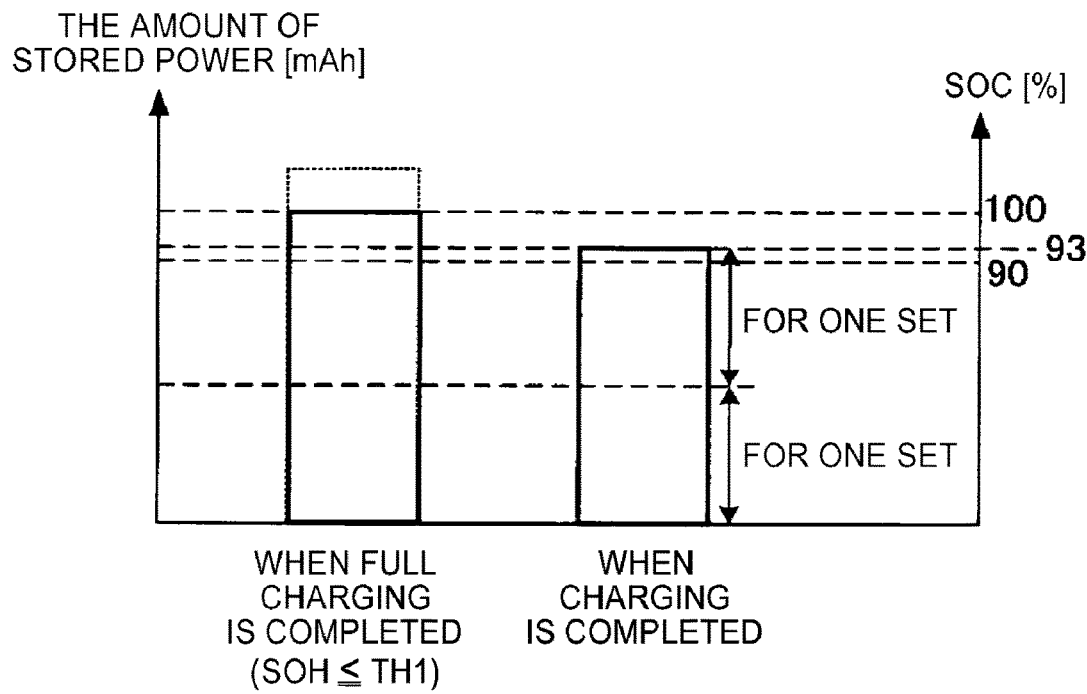
FIG. 8 is a view illustrating an example of the relation between the full charge capacity of the power supply of FIG. 6 when deterioration of the power supply has progressed and the amount of power stored in the power supply when charging is completed.
Figure 9:
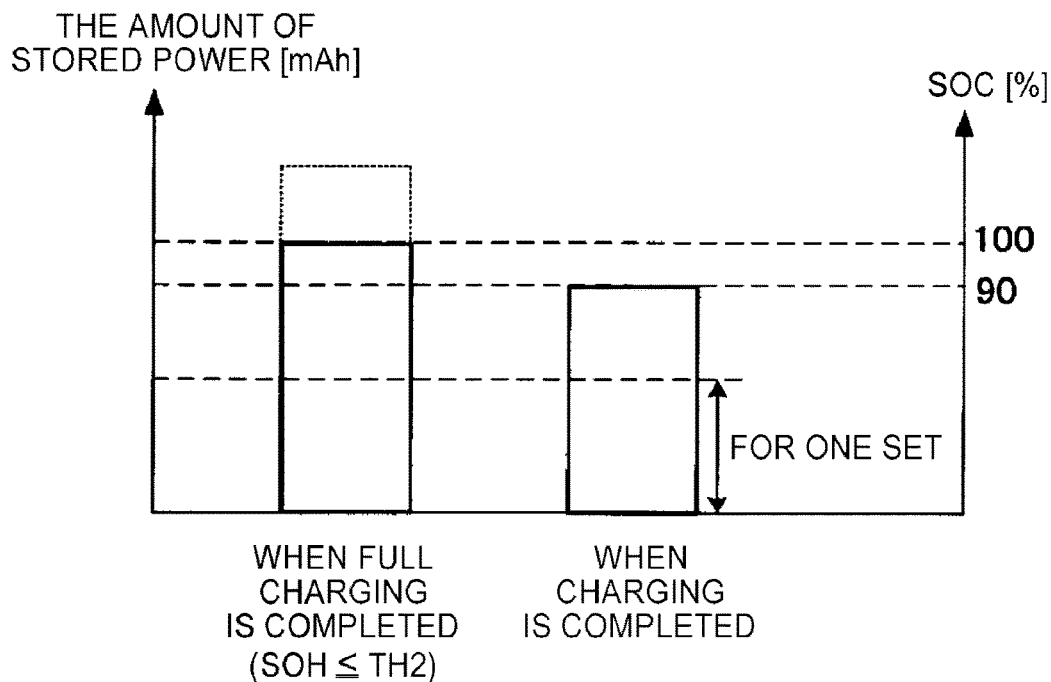
FIG. 9 is a view illustrating an example of the relation between the full charge capacity of the power supply of FIG. 6 when deterioration of the power supply has further progressed and the amount of power stored in the power supply when charging is completed.
Figure 10:
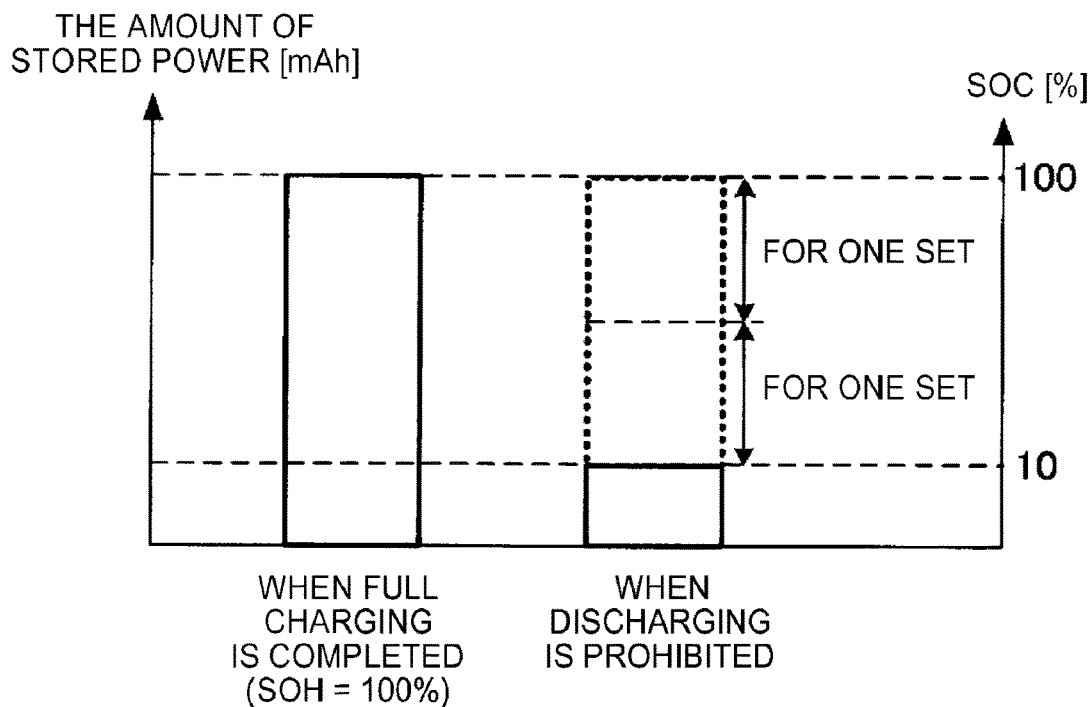
FIG. 10 is a view illustrating an example of the relation between the full charge capacity of the power supply of FIG. 6 when the power supply is brand new and the amount of power stored in the power supply when discharging is prohibited.
Figure 11:
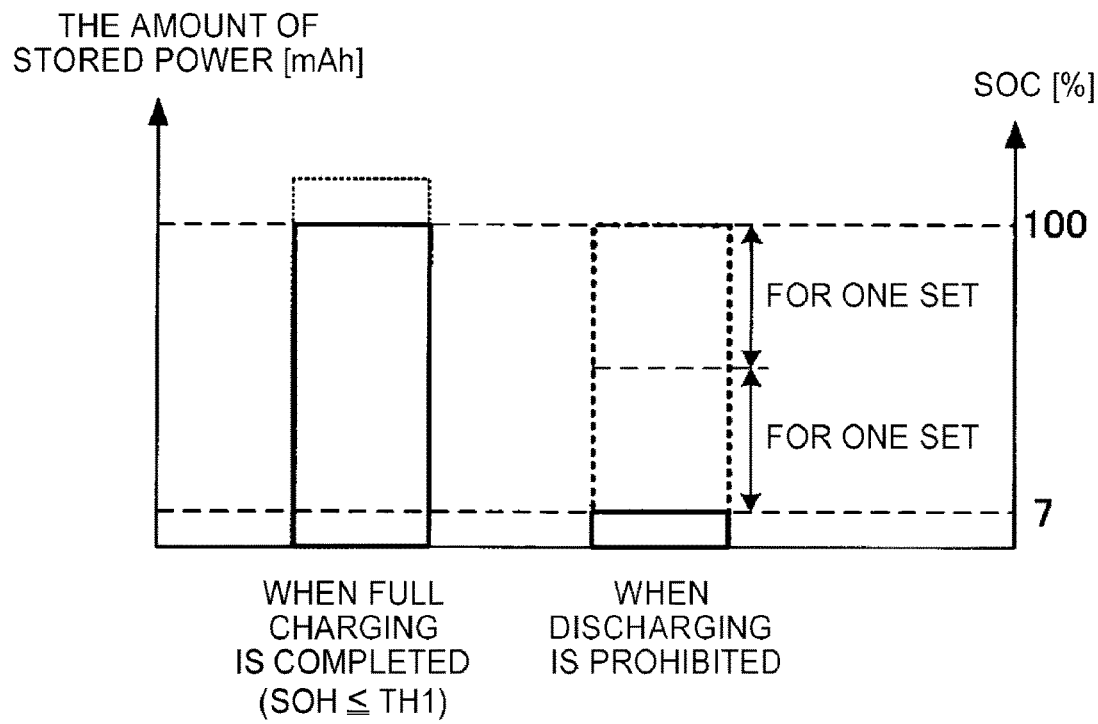
FIG. 11 is a view illustrating an example of the relation between the full charge capacity of the power supply of FIG. 6 when deterioration of the power supply has progressed and the amount of power stored in the power supply when discharging is prohibited.

FIG. 7, FIG. 8, and FIG. 9 are views illustrating examples of the relation between the full charge capacity of the power supply 12 in each of the cases different in the health state of the power supply 12 and the amount of power stored in the power supply when charging is completed.

Hereinafter, as a numerical index indicating the healthy state of the power supply 12, the state of health (SOH) will be described. The SOH is a numeric value which is obtained by dividing the full charge capacity of the power supply 12 when it is in a deteriorated state by the full charge capacity of the power supply 12 when it is brand new and multiplying the quotient by 100, and its unit is %. In other words, in the case where the SOH is a numerical index indicating the healthy state of the power supply 12, a larger SOH value means that the state of the power supply 12 is closer to that of a brand new, and a smaller SOH value means deterioration of the power supply 12 has progressed more. The SOH can be measured or estimated by various methods.

Also, the SOH can be defined as a numeric value which is obtained by dividing the internal resistance value of the power supply 12 when it is in a deteriorated state by the internal resistance value of the power supply 12 when it is brand new and multiplying the quotient by 100. In this case, the SOH is a numerical index indicating the deteriorated state of the power supply 12. In the case where the SOH is a numerical index indicating the deteriorated state of the power supply 12, a larger SOH value means that deterioration of the power supply 12 has progressed more, and a smaller SOH value means that the state of the power supply 12 is closer to that of a brand new.

Hereinafter, the case where the SOH is a numerical index indicating the healthy state of the power supply 12 will be described as an example. Those skilled in the art could understand that even in the case where the SOH is a numerical index indicating the deteriorated state of the power supply 12, similarly, the relation between the full charge capacity of the power supply 12 and the amount of power stored in the power supply 12 when charging is completed can be defined.

In FIG. 7, an example of the full charge capacity in the state where the SOH is 100%, i.e. the power supply 12 is brand new and the amount of stored power when charging is completed is shown. As described above, in the state where the SOH is 100%, capacity which is 90% of the full charge capacity of the power supply 12 is equal to or larger than the amount of necessary power for two sets. For this reason, in this state, the MCU 50 sets the charging stop SOC to 90% which is such a lower limit value that deterioration of the power supply 12 is suppressed, and completes charging when the SOC of the power supply 12 reaches 90%.

In FIG. 8, a state where the SOH is equal to or smaller than a threshold TH1 smaller than 100% is shown. In other words, in FIG. 8, a state where deterioration of the power supply 12 has further progressed as compared to the example of FIG. 7 is shown. In the example of FIG. 8, capacity which is 90% of the full charge capacity of the power supply 12 is smaller than the amount of necessary power for two sets. In this state, the MCU 50 may set the charging stop SOC to, for example, 93% larger than 90%, such that when charging is completed, the amount of necessary power for two sets is secured as the amount of power stored in the power supply 12, and complete charging when the SOC of the power supply 12 reaches 93%. In this case, even if the SOH slightly decreases, when charging is completed, sufficient power to empty two sets of aerosol generation sources is secured.

In FIG. 9, a state where the SOH is equal to or smaller than a threshold TH2 smaller than the threshold TH1 is shown. In other words, in FIG. 9, a state where deterioration of the power supply 12 has further progressed as compared to the example of FIG. 8 is shown. In the example of FIG. 9, the full charge capacity of the power supply 12 is equal to or smaller than the amount of necessary power for two sets. In this state, the MCU 50 sets the charging stop SOC to any one value between 90% and 95%, such that when charging is completed, the amount of necessary power for one set is secured as the amount of power stored in the power supply 12, and completes charging when the SOC of the power supply 12 reaches the set value. In this case, even if the SOH significantly decreases, when charging is completed, sufficient power to empty one set of aerosol generation sources is secured.

Also, the MCU 50 may detect deterioration of the power supply 12 in response to change of the SOH to a value equal to or smaller than the threshold TH2, and notify that the power supply 12 has deteriorated, by the notifying unit 45. Alternatively, the MCU 50 may start the above-mentioned charging stop control on the power supply 12 in response to change of the SOH to a value equal to or smaller than the threshold TH2. In this way, it is possible to suppress further deterioration of the deteriorated power supply 12. Also, until deterioration of the power supply 12 is detected, or until the charging stop control on the power supply 12 is started, in the power supply 12, sufficient power to empty one set of aerosol generation sources is secured. Therefore, user convenience further improves.

Hereinafter, the charging stop control which the MCU 50 performs will be described specifically.

First of all, the MCU 50 measures or estimates the SOH, and estimates the full charge capacity of the power supply 12 from the SOH. In measuring or estimating the SOH, the internal resistance of the power supply 12, the integrated value of power stored and discharged, and so on may be used. Specifically, by multiplying the known full charge capacity of the power supply 12 when it is brand new by the SOH, the current full charge capacity is estimated.

In the case where the value obtained by multiplying the estimated full charge capacity by the lower limit value (90%) for the charging stop SOC is equal to or larger than the amount of necessary power for two sets (the case of FIG. 7), the MCU 50 sets the charging stop SOC to 90% which is the lower limit value. In this way, in the state where deterioration of the power supply 12 is less, it is possible to secure power for consume two sets by performing charging once while effectively suppressing deterioration of the power supply 12.

In the case where the value obtained by multiplying the estimated full charge capacity by the lower limit value (90%) for the charging stop SOC becomes smaller than the amount of necessary power for two sets, and the value obtained by multiplying the estimated full charge capacity by the upper limit value (95%) for the charging stop SOC becomes equal to or larger than the amount of necessary power for two sets (the case of FIG. 8), the MCU 50 sets such an SOC value (a value larger than 90%) that when charging is completed, the amount of necessary power for two sets can be secured as the amount of power stored in the power supply 12, as the charging stop SOC. Even in this case, since the power supply does not become the fully charged state, it is possible to secure power for consume two sets while suppressing deterioration.

In the case where each of the values obtained by multiplying the estimated full charge capacity by the lower limit value (90%) and upper limit value (95%) for the charging stop SOC is smaller than the amount of necessary power for two sets, the MCU 50 determines such charging stop SOC that the amount of stored power when charging is stopped, the amount of necessary power for one set or more can be secured as the amount of stored power, from the range between 90% and 95%. As a result, it is possible to secure power for consuming one set while suppressing deterioration of the power supply 12.

In the case where the value obtained by multiplying the estimated full charge capacity by the upper limit value (95%) for the charging stop SOC is smaller than the amount of necessary power for one set, the MCU 50 controls the notifying unit 45 such that the notifying unit notifies the user that the timing has come to replace the power supply 12.

When the amount of stored charge which is obtained by subtracting the amount of power stored in the power source 12 when discharging of the power supply 12 is prohibited (when SOC is 0%) from the amount of power stored in the power source 12 when charging is completed is defined as a discharging permission power amount, by the above-described control of the MCU 50, it is possible to set an amount equal to or larger than the amount of necessary power for one set or two sets, as the discharging permission power amount. Therefore, not only in the state where the power supply 12 is brand new but also in the state where deterioration has progressed, it is possible to consume at least one set of aerosol generation sources. Therefore, it is possible to improve convenience. Also, since the power supply 12 does not become the fully charged state, it is possible to suppress deterioration.

In the above-described embodiment, the MCU 50 determines the charging stop SOC with reference to the amount of necessary power for two sets. Alternatively, the MCU 50 may determine the charging stop SOC with reference to the amount of necessary power for one set. In this case, in any deteriorated (healthy) state, the charging stop SOC is set to the lower limit value (90%).

Also, it should be noted that the lower limit value (90%) and upper limit value (95%) for the charging stop SOC described in the above embodiment are merely an example. Since they are values depending on each power supply 12 which is used, it is preferable that they be obtained by experiments on individual power supplies 12, and so on.

(First Modification of Charging Stop Control on Power Supply)

In this control, during charging of the power supply 12, the MCU 50 completes charging when the SOC of the power supply 12 becomes 100%. Meanwhile, the MCU 50 determines a lower-limit-side arbitrary range (for example, a range between 10% and 5%) of an SOC range in which the power supply 12 is unlikely to deteriorate, in advance, and stops discharging of power from the power supply 12 to the load 21 (in other words, the MCU prohibits discharging) in the case where the SOC of the power supply 12 reaches a specific value in the determined range in the course of discharging of power from the power supply 12 to the load 21, and notifies the timing to charge the power supply 12 by the notifying unit 45. Hereinafter, the SOC of the power supply 12 when the MCU 50 prohibits discharging of the power supply 12 will be referred to as the discharging prohibition SOC.

As the power supply 12, a high-capacity power supply is used such that capacity obtained by subtracting the amount of stored power corresponding to the maximum value (which is 10%) for the SOC in the arbitrary range from the full charge capacity becomes equal to or larger than t the amount of necessary power for two sets (in other words, the capacity which is 90% of the full charge capacity of the power supply 12 becomes equal to or larger than the amount of necessary power for two sets). As a result, in the state where deterioration of the power supply 12 is less, even if control for prohibiting discharging of the power supply 12 in the state where the SOC is 10% is performed, discharging for emptying two sets of aerosol generation sources is possible.

FIG. 10, FIG. 11, and FIG. 12 are views illustrating examples of the relation between the full charge capacity of the power supply 12 in each of the cases different in the healthy state of the power supply 12 and the amount of power stored in the power supply 12 when discharging is prohibited.

In FIG. 10, an example of the full charge capacity in the state where the SOH is 100%, i.e. the power supply 12 is brand new and the amount of stored power when discharging is prohibited is shown. As described above, in the state where the SOH is 100%, the capacity which is 90% of the full charge capacity of the power supply 12 becomes equal to or larger than the amount of necessary power for two sets. For this reason, in this state, the MCU 50 sets the discharging prohibition SOC to 10% of the upper limit value at which deterioration of the power supply 12 is minimized, and prohibits discharging when the SOC of the power supply 12 reaches 10%.

In FIG. 11, a state where the SOH is equal to or smaller than the threshold TH1 smaller than 100% is shown. In other words, in FIG. 11, the state where deterioration of the power supply 12 has further progressed as compared to the example of FIG. 10 is shown. In the example of FIG. 11, the capacity which is 90% of the full charge capacity of the power supply 12 becomes smaller than the amount of necessary power for two sets. In this state, the MCU sets the discharging prohibition SOC to, for example, 7% smaller than 10% such that the difference between the full charge capacity and the amount of power stored in the power supply 12 when discharging is stopped becomes the amount of necessary power for two sets, and prohibits discharging of the power supply 12 when the SOC of the power supply 12 reaches 7%. In this case, even if the SOH slightly decreases, when charging is completed, sufficient power to empty two sets of aerosol generation sources is secured.

Figure 12:
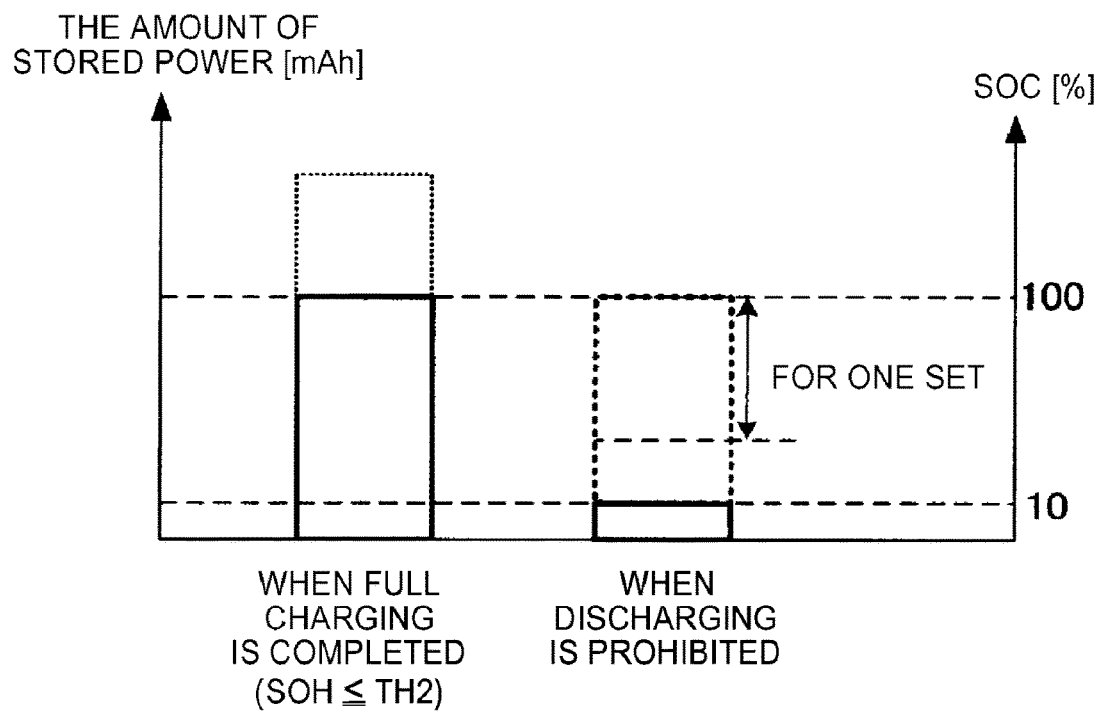
FIG. 12 is a view illustrating an example of the relation between the full charge capacity of the power supply of FIG. 6 when deterioration of the power supply has further progressed and the amount of power stored in the power supply when discharging is prohibited.

In FIG. 12, a state where the SOH is equal to or smaller than the threshold TH2 smaller than the threshold TH1 is shown. In other words, in FIG. 12, a state where deterioration of the power supply 12 has further progressed as compared to the example of FIG. 11 is shown. In the example of FIG. 12, the full charge capacity of the power supply 12 is equal to or smaller than the amount of necessary power for two sets. In this state, the MCU 50 sets the discharging prohibition SOC to any one value between 10% and 5% such that the difference between the full charge capacity and the amount of power stored in the power supply 12 when discharging is stopped becomes equal to or larger than the amount of necessary power for one set, and prohibits discharging when the SOC of the power supply 12 reaches the set value. In this case, even if the SOH significantly decreases, when charging is completed, sufficient power to empty one set of aerosol generation sources is secured.

Also, the MCU 50 may detect deterioration of the power supply 12 in response to change of the SOH to a value equal to or smaller than the threshold TH2, and notify that the power supply 12 has deteriorated, by the notifying unit 45. Alternatively, the MCU 50 may start the above-mentioned discharging stop control on the power supply 12 in response to change of the SOH to a value equal to or smaller than the threshold TH2. In this way, it is possible to suppress further deterioration of the deteriorated power supply 12. Also, until deterioration of the power supply 12 is detected, or until the discharging stop control on the power supply 12 is started, in the power supply 12, sufficient power to empty one set of aerosol generation sources is secured. Therefore, user convenience further improves.

Hereinafter, the discharging stop control which the MCU 50 performs will be described specifically.

First of all, the MCU 50 measures or estimates the SOH, and estimates the full charge capacity of the power supply 12 from the SOH. In measuring or estimating the SOH, the internal resistance of the power supply 12, the integrated value of power stored and discharged, and so on may be used. Specifically, by multiplying the known full charge capacity of the power supply 12 when it is brand new by the SOH, the current full charge capacity is estimated.

In the case where capacity which is obtained by multiplying the full charge capacity estimated in the above-mentioned way by the upper limit value (10%) for the discharging prohibition SOC and subtracting the result value from the estimated full charge capacity is equal to or larger than the amount of necessary power for two sets (the case of FIG. 10), the MCU 50 sets the discharging prohibition SOC to 10% which the upper limit value. In this way, in the state where deterioration of the power supply 12 is less, it is possible to secure power for consume two sets by performing charging once while effectively suppressing deterioration of the power supply 12.

In the case where the capacity which is obtained by multiplying the estimated full charge capacity by the lower limit value (5%) for the discharging prohibition SOC and subtracting the result value from the estimated full charge capacity becomes equal to or larger than the amount of necessary power for two sets, and the capacity which is obtained by multiplying the estimated full charge capacity by the upper limit value (10%) for the discharging prohibition SOC and subtracting the result value from the estimated full charge capacity becomes smaller than the amount of necessary power for two sets (the case of FIG. 11), the MCU sets such an SOC value (a value smaller than 10%) that capacity which is obtained by subtracting the amount of power stored in the power supply 12 when discharging is prohibited from the full charge capacity becomes the amount of necessary power for two sets, as the discharging prohibition SOC. Even in this case, since the power supply does not become the discharging termination state, it is possible to secure power for consume two sets while suppressing deterioration.

In the case where each of the capacity which is obtained by multiplying the estimated full charge capacity by the lower limit value (5%) for the discharging prohibition SOC and subtracting the result value from the estimated full charge capacity, and the capacity which is obtained by multiplying the estimated full charge capacity by the upper limit value (10%) the discharging prohibition SOC and subtracting the result value from the estimated full charge capacity becomes smaller than the amount of necessary power for two sets (the case of FIG. 12), the MCU determines such a value that the capability which is obtained by subtracting the amount of power stored in the power supply 12 when discharging is prohibited from the full charge capacity becomes the amount of necessary power for one set, as the discharging prohibition SOC from the range between 10% and 5%. As a result, it is possible to secure power for consuming one set while suppressing deterioration of the power supply 12.

In the case where the capacity which is obtained by multiplying the estimated full charge capacity by the lower limit value (5%) for the discharging prohibition SOC and subtracting the result value from the estimated full charge capacity becomes smaller than the amount of necessary power for one set, the MCU 50 controls the notifying unit 45 such that the notifying unit notifies the user that the timing has come to replace the power supply 12.

When the amount of stored power obtained by subtracting the amount of power stored in the power source 12 when discharging of the power supply 12 is prohibited from the amount of power stored in the power source 12 when charging is completed is defined as the discharging permission power amount, by the above-described discharging stop control of the MCU 50, it is possible to set an amount equal to or larger than the amount of necessary power for one set or two sets, as the discharging permission power amount. Therefore, not only in the state where the power supply 12 is brand new but also in the state where deterioration has progressed, it is possible to consume at least one set of aerosol generation sources. Therefore, it is possible to improve convenience. Also, since the power supply 12 does not become the discharging termination state, it is possible to suppress deterioration.

In the above-described embodiment, the MCU 50 determines the discharging prohibition SOC with reference to the amount of necessary power for two sets. Alternatively, the MCU 50 may determine the discharging prohibition SOC with reference to the amount of necessary power for one set. In this case, in any deteriorated (healthy) state, the discharging prohibition SOC is set to the upper limit value (10%).

Also, it should be noted that the lower limit value (5%) and upper limit value (10%) for the discharging prohibition SOC described in the above embodiment are merely an example. Since they are values depending on each power supply 12 which is used, it is preferable that they are obtained by experiments on individual power supplies 12, and so on.

(Second Modification of Charging Stop Control on Power Supply)

The MCU 50 may perform control for completing charging when the SOC of the power supply 12 becomes the specific value in the upper-limit-side arbitrary range, in the course of charging of the power supply 12, and prohibiting discharging when the SOC of the power supply 12 becomes the specific value in the lower-limit-side arbitrary range, in the course of discharging of the power supply 12. In other words, the MCU 50 may control each of charging and discharging of the power supply 12 such that the power supply 12 does not become any of the fully charged state and the discharging termination state.

When the amount of stored power which is obtained by subtracting the amount of power stored in the power source 12 when discharging of the power supply 12 is prohibited from the amount of power stored in the power source 12 when charging is completed is defined as the discharging permission power amount, the MCU 50 sets each of the charging stop SOC and the discharging prohibition SOC, such that the discharging permission power amount becomes the amount of necessary power for one set or two sets. In this case, not only in the state where the power supply 12 is brand new but also in the state where deterioration has progressed, it becomes possible to consume at least one set of aerosol generation sources. Therefore, it is possible to improve convenience. Also, since the power supply 12 does not become any of the fully charged state and the discharging termination state, it is possible to further suppress deterioration.

(Third Modification of Charging Stop Control on Power Supply)

Charging stop control which is performed in the case where one set composed of one first cartridge 20 and a plurality of (for example, five) second cartridges 30 is provided as aerosol generation sources to the user will be described below. In this case, in order to empty one brand new (unused) first cartridge 20, it is required to empty five brand new (unused) second cartridges 30. The amount of necessary power may be set on the basis of the amount of power required to consume one brand new (unused) first cartridge 20, or may be set on the basis of the amount of power required to consume one brand new (unused) second cartridge 30.

In the case of setting the amount of necessary power on the basis of the amount of power required to consume one brand new (unused) first cartridge 20, the power supply 12 has sufficient power to consume one set. Therefore, it is possible to prevent the frequency of charging of the power supply 12 from excessively increasing while suppressing deterioration of the power supply 12.

In the case of setting the amount of necessary power on the basis of the amount of power required to consume one brand new (unused) second cartridge 30, it is possible to reduce the size, weight, and cost of the power supply 12.

In the above description, the MCU 50 controls at least one of the charging stop SOC and the discharging prohibition SOC. However, of this control, the control on the charging stop SOC may be performed by the charging IC 55.

In this specification, at least the following inventions (1) to (14) are disclosed.

(1) A power supply unit for an aerosol inhaler comprising:

a power supply that is able to discharge power to a load for generating an aerosol from an aerosol generation source; and a control unit that is configured to control at least one of charging and discharging of the power supply such that the power supply does not become one or both of a fully charged state and a discharging termination state.

According to (1), since the power supply is controlled such that the power supply does not become one or both of the fully charged state and the discharging termination state, it is possible to suppress deterioration of the power supply. Especially, in devices which can be frequently used and be charged and discharged, like aerosol inhalers, by performing such control, it is possible to suppress deterioration of their power supplies, thereby extending the lives of the devices. In addition, it is possible to obtain energy saving effect.

(2) The power supply unit according to (1), wherein a remainder which is obtained by subtracting an amount of power stored in the power supply to cause the discharging to be prohibited from an amount of power stored in the power supply in a state where the charging is completed is defined as a discharging permission power amount, and the control unit controls at least one of the charging and the discharging of the power supply such that the discharging permission power amount becomes equal to or larger than an amount of power required to be supplied to the load in order to empty the aerosol generation source which is unused.

According to (2), in the state where the charging of the power supply is completed, it becomes possible to consume the unused aerosol generation source by the aerosol inhaler. Therefore, it is possible to prevent a situation in which it becomes impossible to generate an aerosol in the state where there is the remaining amount of the aerosol generation source, and it is possible to prevent frequent charging of the power supply, thereby suppressing deterioration of the power supply. In other words, it is possible to achieve both of suppression of deterioration of the power supply and improvement of user convenience.

(3) The power supply unit according to (2), wherein the aerosol generation source includes a first unit containing a medium to be atomized by the load, and a second unit containing a flavor source to add a flavor to the atomized medium, and the control unit controls at least one of the charging and the discharging of the power supply such that the discharging permission power amount becomes equal to or larger than an amount of power required to be supplied to the load in order to empty a predetermined number, which is one or more, of the first unit.

According to (3), in the state where the charging of the power supply is completed, it becomes possible to consume the predetermined number of the first unit by the aerosol inhaler. For example, in the case where a plurality of second units can be used by one first unit, it becomes possible to consume many second units by performing charging once. Therefore, it is possible to prevent frequent charging of the power supply, thereby suppressing deterioration of the power supply.

(4) The power supply unit according to (2), wherein
the aerosol generation source includes a first unit containing a medium to be atomized by the load, and a second unit containing a flavor source to add a flavor to the atomized medium, and
the control unit controls at least one of the charging and the discharging of the power supply such that the discharging permission power amount becomes equal to or larger than an amount of power required to be supplied to the load in order to empty a predetermined number, which is one or more, of the second unit.

According to (4), in the state where the charging of the power supply is completed, it becomes possible to consume the predetermined number of the second unit by the aerosol inhaler. For example, a configuration in which the discharging permission power amount of the power supply becomes equal to or larger than the amount of power required to empty a plurality of second units can be made to make it possible to consume many second units by performing charging once. In this case, it is possible to prevent frequent charging of the power supply, thereby suppressing deterioration of the power supply.

Also, by making a configuration in which the discharging permission power amount of the power supply becomes equal to or larger than the amount of power required to empty, for example, one second unit, it is possible to reduce the capacity of the power supply, and it is possible to reduce the size, weight, and cost of the aerosol inhaler. Also, since it is possible to make the amount of power for consuming one second unit smaller than the amount of power for consuming one first unit, it is possible to reduce the capacity of the power supply, and it is possible to reduce the size, weight, and cost of the aerosol inhaler.

(5) An aerosol inhaler comprising:
the power supply unit according to (3) or (4);
the first unit; and
the second unit that is emptied more quickly than the first unit which is unused if discharging of power to the load is performed when the second unit is unused.

(6) The power supply unit according to (1), wherein
a remainder which is obtained by subtracting an amount of power stored in the power supply to cause the discharging to be prohibited from an amount of power stored in the power supply in a state where the charging is completed is defined as a discharging permission power amount, and
the control unit controls at least one of the charging and the discharging of the power supply such that the discharging permission power amount in a first state where a numerical index indicating a state where the charging of the power supply is completed and a deteriorated state of the power supply is smaller than a threshold or a numerical index indicating a healthy state of the power supply is equal to or larger than a threshold becomes equal to or larger than an amount of power required to be supplied to the load in order to empty the aerosol generation source which is unused.

According to (5), in the state where deterioration of the power supply has not progressed, the discharging permission power amount equal to or larger than the amount of power required to be supplied to the load in order to empty the aerosol generation source unused is secured. Therefore, even if the deterioration of the power supply progresses, it is possible to secure sufficient power to empty the unused aerosol generation source. Also, by reducing the discharging permission power amount in the above-mentioned state, it is possible to reduce the capacity of the power supply, and it is possible to reduce the size, weight, and cost of the aerosol inhaler.

(7) The power supply unit according to (6), wherein
the first state is a state of the power supply which is brand new.

(8) The power supply unit according to (1), (6), or (7), wherein
a remainder which is obtained by subtracting an amount of power stored in the power supply to cause the discharging to be prohibited from an amount of power stored in the power supply in a state where the charging is completed is defined as a discharging permission power amount, and
the control unit controls at least one of the charging and the discharging of the power supply such that the discharging permission power amount in a second state where a numerical index indicating a state where charging of the power supply is completed and a deteriorated state of the power supply is equal to or larger than a threshold or a numerical index indicating a healthy state of the power supply is smaller than a threshold becomes equal to or larger than an amount of power required to be supplied to the load in order to empty the aerosol generation source which is unused.

According to (8), even if deterioration of the power supply progresses, whereby the full charge capacity of the power supply decreases, the discharging permission power amount equal to or larger than the amount of power required to be supplied to the load in order to empty the unused aerosol generation source is secured. Therefore, it becomes possible to use up the unused aerosol generation source. Also, by reducing the discharging permission power amount in the above-mentioned state, it becomes possible to reduce the capacity of the power supply, and it is possible to reduce the size, weight, and cost of the aerosol inhaler.

(9) The power supply unit according to (8), wherein
the second state is a state where the control unit detects deterioration of the power supply or suppresses the charging and the discharging of the power supply.

(10) The power supply unit according to any one of (1) to (9), wherein
the control unit performs the charging of the power supply such that the power supply does not become the fully charged state.

According to (10), it is possible to shorten the time required for completing the charging of the power supply.

(11) The power supply unit according to (10), wherein
the control unit performs the charging of the power supply such that an upper limit value for SOC indicating a ratio of an amount of power stored in the power supply to a full charge capacity of the power supply becomes equal to or smaller than 95%.

According to (11), the capacity of the power supply is set to be large such that it is possible to supply power more than power required to empty the aerosol generation source to the load in a state where the SOC is 95%. Therefore, even if deterioration of the power supply progresses, whereby the capacity decreases, it is possible to secure power for consuming the aerosol generation source, and it is possible to extend the life of the aerosol inhaler.

(12) The power supply unit according to (11), wherein the control unit performs the charging of the power supply such that the upper limit value for SOC indicating the ratio of the amount of power stored in the power supply to the full charge capacity of the power supply becomes equal to or smaller than 90%.

According to (12), the capacity of the power supply is set to be large such that it is possible to supply power more than power required to empty the aerosol generation source to the load in a state where the SOC is 90%. Therefore, even if deterioration of the power supply progresses, whereby the capacity decreases, it is possible to secure power for consuming the aerosol generation source, and it is possible to extend the life of the aerosol inhaler.

(13) A power supply control method of an aerosol inhaler, the aerosol inhaler including a power supply that is able to discharge power to a load for generating an aerosol from an aerosol generation source, the power supply control method comprising:

a control step of controlling at least one of charging and discharging of the power supply such that the power supply does not become one or both of a fully charged state and a discharging termination state.

(14) A power supply control program of an aerosol inhaler, the aerosol inhaler including a power supply that is able to discharge power to a load for generating an aerosol from an aerosol generation source, the power supply control program making a computer execute:

a control step of controlling at least one of charging and discharging of the power supply such that the power supply does not become one or both of a fully charged state and a discharging termination state.

According to (13) and (14), since the power supply is controlled such that the power supply does not become one or both of the fully charged state and the discharging termination state, it is possible to suppress deterioration of the power supply. Especially, in devices which can be frequently used and be charged and discharged, like aerosol inhalers, by performing such control, it is possible to suppress deterioration of their power supplies, thereby extending the lives of the devices. In addition, it is possible to obtain energy saving effect.

According to (1), (13), and (14), since the power supply is controlled such that the power supply does not become one or any one of the fully charged state and the discharging termination state, it is possible to suppress deterioration of the power supply. Especially, in devices which can be frequently used and be charged and discharged, like aerosol inhalers, by performing such control, it is possible to suppress deterioration of their power supplies, thereby extending the lives of the devices. Therefore, there is energy saving effect in which it is possible to use the power supply for a long time without replacing with a brand new one.

According to the present invention, it is possible to suppress deterioration in the performance of the power supply.

What is claimed is:

1. An aerosol inhaler, comprising: a power supply that is able to discharge power to a heating resistor for generating an aerosol from an aerosol generation source; and a control unit that is configured to perform control to cause power discharge from the power supply to the heating resistor such that the power supply is not fully-discharged, wherein the control unit controls discharge of the power supply such that an amount of power of the power supply at which to stop discharge of power from the power supply to the heating resistor such that the power supply is not fully-discharged is made to be an amount of power in accordance with a State of Health (SoH) of the power supply so that an amount of power required to be supplied to the heating resistor is an amount of power of the power supply which is necessary to consume two aerosol generation sources that are unused.

2. The aerosol inhaler according to claim 1, wherein the control unit reduces, in accordance with a degree of deterioration of the power supply, the amount of power of the power supply at which to stop the discharge of power from the power supply to the heating resistor.

3. The aerosol inhaler according to claim 1, further comprising a plurality of light emitting elements,
wherein the control unit changes a number of light emitting elements that are lit among the plurality of light emitting elements between a first case of a state in which the power supply is in a fully charged state or is in a predetermined state in which the remaining amount of power stored in the power supply is less than the amount of power in the fully charged state, and a second case of a state in which the remaining amount of power stored in the power supply is less than the amount of power stored in the power supply in the predetermined state.

4. A power supply control method of an aerosol inhaler, the aerosol inhaler including a power supply that is able to discharge power to the heating resistor for generating an aerosol from an aerosol generation source, the power supply control method comprising: a control step of performing control to cause power discharge from the power supply to the heating resistor such that the power supply is not fully-discharged, wherein the control step controls discharge of the power supply such that an amount of power of the power supply at which to stop discharge of power from the power supply to the heating resistor such that the power supply is not fully-discharged is made to be an amount of power in accordance with a State of Health (SoH) of the power supply so that an amount of power required to be supplied to the heating resistor, in a state in which charging of the power supply is completed, is an amount of power of the power supply which is necessary to two aerosol generation sources that are unused.

5. A power supply control program of an aerosol inhaler having a power supply that is able to discharge power to the heating resistor for generating an aerosol from an aerosol generation source, the program making a computer execute: a control step of performing control to cause power discharge from the power supply to the heating resistor such that the power supply is not fully-discharged, wherein the control step controls discharge of the power supply such that an amount of power of the power supply at which to stop discharge of power from the power supply to the heating resistor such that the power supply is not fully-discharged is made to be an amount of power in accordance with a State of Health (SoH) of the power supply so that an amount of power required to be supplied to the heating resistor, in a state in which charging of the power supply is completed, is an amount of power of the power supply which is necessary to consume two aerosol generation sources that are unused.

* * * * *